United States Patent [19]
Meckler

[11] Patent Number: 6,050,083
[45] Date of Patent: *Apr. 18, 2000

[54] GAS TURBINE AND STEAM TURBINE POWERED CHILLER SYSTEM

[76] Inventor: Milton Meckler, 930 20th St., Santa Monica, Calif. 90403

[*] Notice: This patent issued on a continued prosecution application filed under 37 CFR 1.53(d), and is subject to the twenty year patent term provisions of 35 U.S.C. 154(a)(2).

[21] Appl. No.: 08/635,756

[22] Filed: Apr. 22, 1996

Related U.S. Application Data

[63] Continuation-in-part of application No. 08/466,401, Jun. 6, 1996, abandoned, and application No. 08/427,852, Apr. 24, 1995, Pat. No. 5,600,967.

[51] Int. Cl.[7] ................................................ F02C 6/00
[52] U.S. Cl. .................................. 60/39.182; 60/39.181; 60/39.07; 62/434; 62/238.3
[58] Field of Search ..................... 60/39.181, 39.182, 60/39.19, 728, 39.07, 655, 651; 62/238.3, 434

[56] References Cited

U.S. PATENT DOCUMENTS

| | | | |
|---|---|---|---|
| Re. 31,697 | 10/1984 | Gomberg et al. | 60/655 |
| 3,266,246 | 8/1966 | Heller et al. | 60/655 |
| 3,796,045 | 3/1974 | Foster-Pegg | 60/39.182 |
| 3,971,211 | 7/1976 | Wethe et al. | 60/39.181 |
| 3,974,642 | 8/1976 | Pacault | 60/39.182 |
| 4,199,961 | 4/1980 | Carter et al. | 62/535 |
| 4,290,273 | 9/1981 | Meckler | 62/148 |
| 4,328,677 | 5/1982 | Meckler | 62/124 |
| 4,594,850 | 6/1986 | Joy | 60/39.182 |
| 4,720,968 | 1/1988 | Knizia | 60/39.182 |
| 4,815,527 | 3/1989 | Meckler | 165/50 |
| 4,907,405 | 3/1990 | Polizzotto | 60/39.07 |
| 5,101,772 | 4/1992 | Bruhn | 122/7 B |
| 5,565,716 | 10/1996 | Tierney, Jr | 62/434 |
| 5,600,967 | 2/1997 | Meckler | 62/476 |
| 5,632,148 | 5/1997 | Bronicki et al. | 60/728 |
| 5,799,626 | 9/1998 | Ponsford et al. | 123/41.42 |

*Primary Examiner*—Ted Kim
*Attorney, Agent, or Firm*—Whitman Breed Abbott & Morgan LLC; Gregor N. Neff

[57] ABSTRACT

A fueled refrigeration and generating system comprised of a Brayton cycle gas turbine producing shaft power preferably driving a refrigeration compressor. Heat is recovered from the high-temperature exhaust of the turbine by a heat exchanger using a high temperature-resistant heat transfer medium. The heat-transfer medium is used to produce high-temperature water and steam. A steam turbine is operated by the steam and produces shaft power for driving an electrical generator. Each of the turbines individually operates refrigeration and/or chiller compressors, or by gearing, drive a common power shaft. The system produces, selectively, hot water, steam, chilled water, ice and electrical energy.

8 Claims, 5 Drawing Sheets

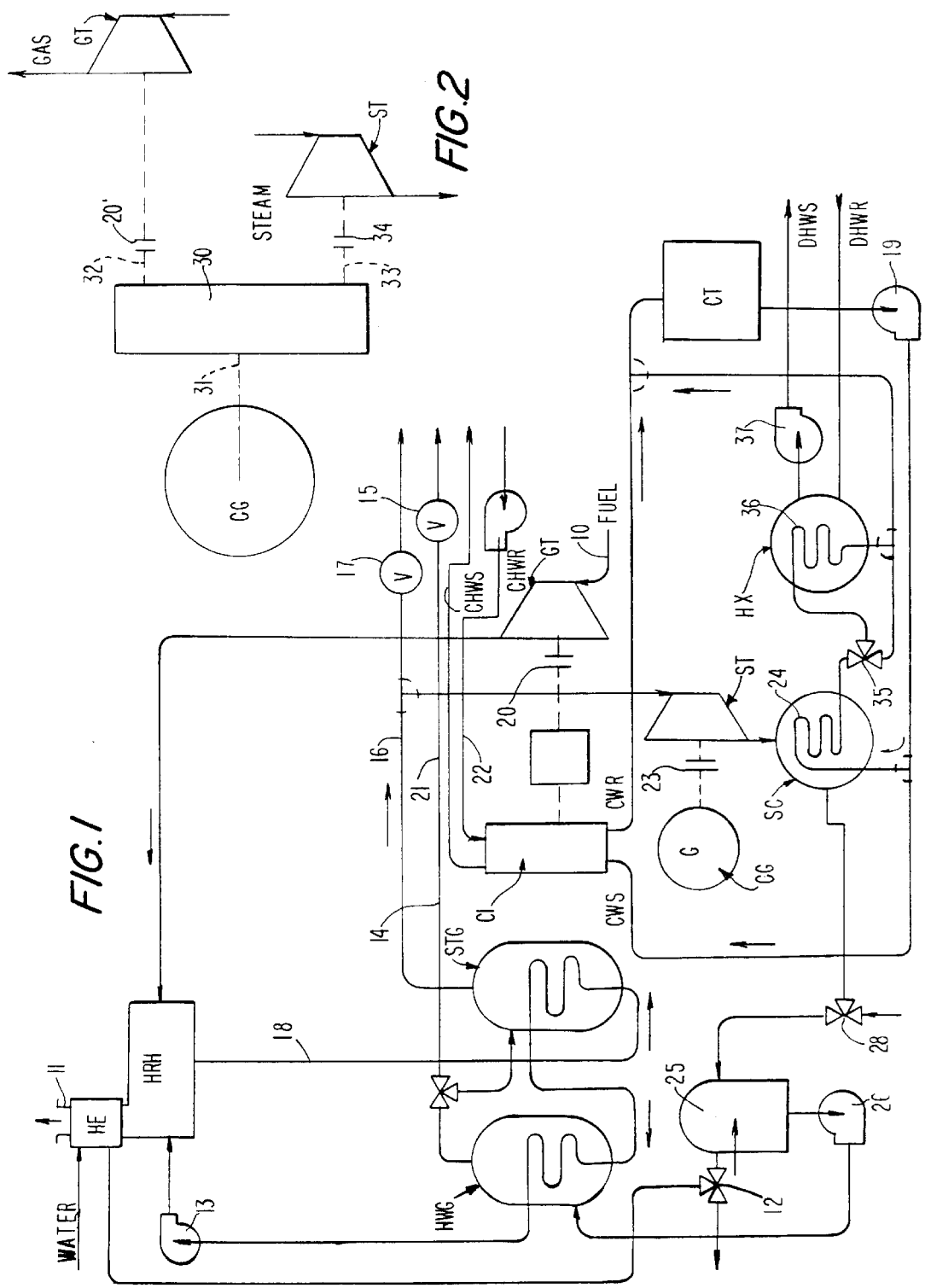

GAS TURBINE AND STEAM TURBINE POWERED CHILLER SYSTEM

This patent application is a continuation-in-part of U.S. patent application Ser. No. 08/466,401 filed Jun. 6, 1996, now abandoned and U.S. patent application Ser. No. 08/427,852 filed Apr. 24, 1995, now U.S. Pat. No. 5,600,967.

BACKGROUND OF THE INVENTION

This invention relates to the generation of power for air conditioning systems, processing and co-generation, and is characterized by a primary gas turbine that produces shaft power and an exhaust that produces a high temperature liquid state heat transfer media for selective uses including steam activated adsorption chilling, steam-jet refrigeration, and steam generating; and by a secondary steam turbine operated by said steam generation to produce shaft power coupled by clutch means through a gear means that reduces the two turbine shaft speeds to a common power shaft speed driving air conditioning systems including a vapor compression chiller system, a vapor compression refrigeration system, and a co-generation system for electrical power.

It is a general object of this invention to drive an air conditioning system with a reduced size and cost effective hybrid power system. To this end a constant speed gas turbine is combined with a constant speed steam turbine operating on steam generated from the exhaust heat of the gas turbine. Generally, there is disparity in the shaft speeds of these two turbines, gas and steam, it being an object of this invention to cooperatively combine the torque outputs of each so as to unite in a common power output shaft to drive either the air conditioning system or the co-generation system. In practice, the shaft speed of a typical gas turbine is 12,000 to 15,000 revolutions per minute (RPM), whereas a typical steam turbine is approximately 3,000 RPM. It is an object of this invention to reduce the shaft speed of the gas turbine and the steam turbine to a common output power shaft speed.

The primary gas turbine is operated at an optimum shaft speed as required, by a mechanical chiller unit or electrical co-generator. In carrying out this invention, the shaft speeds of the two turbines are individually controlled by means of speed limiting governors. The primary gas turbine operates in the Brayton cycle and is the energy producing prime mover, in that it produces shaft power and exhaust heat that contains energy in the Rankine Cycle range. The Brayton turbine cycle employs a compressor followed by a combustion chamber, and an air engine to produce power. An axial flow gas turbine embodiment of the Brayton cycle is characterized by an axial flow compressor that compresses and heats induction air. The compressed air enters a combustion chamber where the temperature is increased by means of burning fuel, a hydrocarbon and preferably gas, while the pressure remains constant. The resulting high temperature mixture of combusted gases and air then enters a turbine at high velocity to perform the work of producing shaft power. The exhaust temperature of a gas turbine is high-in the range of 1500° F. Accordingly, it is an object of this invention to capture the exhaust heat energy from the gas turbine and convert it into additional shaft power by use of a steam turbine. Both gas and steam turbines are reliable in their operation and are characteristically compact.

A feature of this invention is the initial operation of the primary gas turbine that is directly coupled to the air conditioning system or co-generator system, followed by operation of the secondary steam turbine that relies upon the exhaust heat energy recovery from said gas turbine. A feature of this invention, therefore, is the clutch means that couples the shaft drives from the two turbines. In practice, the clutch coupling the steam turbine to the power shaft is an over-riding clutch, for example, a Sprague-type clutch. Therefore, after the gas turbine reaches operating speed, the steam turbine responds to steam generated from the gas turbine exhaust and reaches the shaft speed to complement the power output by adding torque thereto.

The hybrid power system herein disclosed utilizes shaft power from a gas turbine to operate air conditioning, refrigeration processing and co-generation equipment, and also utilizes exhaust heat to operate air conditioning and refrigeration process equipment. A feature of this invention is that the shaft power of the primary gas turbine is supplemented by shaft power from a secondary steam turbine also operating from said exhaust heat, thereby conserving the energy not used by said air conditioning and refrigeration processing. This conserved energy is then used in the co-generation of electrical power. The shaft power of the two turbines can be employed separately for processing systems and co-generation, or jointly through a common power shaft to operate a processing system or co-generator, as is shown and later described, it being an object to conserve energy by using the remainder thereof to drive a co-generator.

A first utilitarian processing system advantageously combined with the hybrid power system herein disclosed is the subject of my co-pending application Ser. No. 08/427,832 filed Apr. 24, 1995, wherein concentrated absorbent solution in a closed absorption chiller is concentrated by vapor compression from an evaporator followed by liquification by a condenser with heat transfer from the condenser into the evaporator, increasing solution concentration and chilling capacity with an increased coefficient of performance, resulting in an increase in chilling. This chiller provides a refrigerant enhancement and absorbent concentrator unit that increases the efficiency of absorption chillers, in any one of the generally recognized types thereof, by increasing the volume of water refrigerant supplying the evaporator at the chilling coils and simultaneously concentrating the absorbent solution at the heat absorber that removes heat from the system for discharge at a cooling tower or the like. It is the chilling mode of operation with which this chiller is particularly concerned, providing a unit that is compatible with and acceptable to existent air conditioning systems of the type under consideration, in either a cooling mode or heating mode as the case may be, and particularly with double effect absorption chiller systems. The basic principle is the use of heat and produce a strong absorbent solution of lithium-bromide and water, and the distillation therefrom of a water vapor refrigerant that is condensed in an evaporator to thereby chill system water that is usefully circulated. The absorbent solution is weakened in the process and heat removed therefrom and eliminated by means of an absorber that transfers said heat to a cooling tower or the like. An enhancer-concentrator unit is employed in circuit with said absorber to remove heat from the system and is adaptable to single or double effect systems.

A second utilitarian processing system advantageously combined with the hybrid power system disclosed herein is the subject of my U.S. Letters Pat. No. 4,290,273 issued Sep. 22, 1981, entitled PELTIER EFFECT ABSORPTION CHILLER-HEAT PUMP SYSTEM, wherein a chiller and heat pump system employs a steam-jet refrigeration unit associated with a condenser and with an evaporator absorption unit, and associated pump means and valve control means for multi-mode operation including; simultaneous heating and cooling, cooling, heating, and simultaneous high temperature heating and cooling. This chiller provides a heat pump in combination with a Steam-Jet Refrigeration Unit, a Condenser, and an Evaporation-Absorber Unit. These components are associated in a system or apparatus put into operation primarily by the application of heat energy and assisted by the application of solar energy or other available waste heat such as engine exhaust; with circulation pumps and control valves for the general object of providing a multi-purpose Chiller-Heat Pump having selective modes of operation, namely: 1) Simultaneous Low Temperature Heating and Cooling; 2) Cooling; 3) Heating; and 4) Simultaneous High Temperature Heating and Cooling.

Steam-jet refrigeration apparatus as it is employed herein is a fluid pressure apparatus that operates through the application thereto of primary high pressure steam used to energize an ejector that induces a secondary fluid in the form of vapor drawn from an evaporation chamber. The primary motive steam is expanded through a converging-diverging nozzle to velocities in the order of 1200 meters per second (4000 fps.) The corresponding nozzle pressure is very high, and the high velocity steam issuing from the nozzle entrains the water vapor leaving the suction-evaporation chamber, and the two streams merge in a mixing section that converges in the direction of flow. Such an arrangement is diagrammed in the drawings. Warm water return is sprayed into an evaporator chamber and the chilled water is withdrawn therefrom and utilized for space conditioning.

A third utilitarian processing system advantageously combined with the hybrid power system disclosed herein is the subject of my U.S. Letters Pat. No. 4,328,677 issued May 11, 1982, entitled PELTIER FREEZE CONCENTRATION PROCESS for the treatment of dilute solutions and freeze concentrations thereof by means of steam-jet refrigeration and pre-cooling of a feed solution sprayed into an absorber-freezer means in which heat is absorbed from the jet refrigeration and from which ice slurry is charged into a melter-worker means discharging product melt and concentrated by-product. The distillation of alcohol from grains and the like produces dilute liquid solutions that are rich in energy producing materials referred to as Distillers Dried Grains and Solubles or "DDGS", which is the main by-product of alcohol production. As a by-product commodity, it is required that DDGS be produced and sold in a dry state or condition, for example, as bulk feed to be used in animal husbandry. Characteristically, and based, for example, upon corn, DDGS is 99% dry substance, 28–31% raw protein, 12–13% raw fat, 10% raw fibers, 5–6% ash, and 41–43% Nitrogen free extract. For example, in the manufacture of Ethanol, the following feed stock can be used: Wheat, Corn, Rice and Sugar.

Accordingly, this Freeze Concentration Process is not to be limited to the material processed, whether it be the purification of a primary fluid such as sea and/or brackish water, or other inorganic and organic solutions refining concentrations such as DDGS. The process involved herein is the vacuum freezing process in which the freezing is accomplished in a stirred tank crystallizer due to the vaporization of water vapor which, in turn, is absorbed in an adjacent chamber by a concentrated solution of sodium chloride (NaCl) diluted by the water vapor pumped to a compressor where it is concentrated to its original strength by vapor compression apparatus using a closed circuit.

It is a general object of this invention, with respect to said third system, to usefully employ the effects produced by the simultaneous production of pressurized steam and strengthened absorbent. Accordingly, these effects are advantageously employed in the combined operations of a steam-jet refrigeration means and a primary source of absorbent fluid (NaCl) in a closed circuit between the source and the absorber section of the absorber-freezer means; and a secondary heat transfer fluid (NaCl) flows in a closed circuit between the steam-jet refrigeration means and the input of dilute feed solution into the freezer section of the absorber-freezer means. A feature is the complementary refrigeration of heat transfer fluid (NaCl) by the steam-jet refrigeration means and by the absorber section of the absorber-freezer means, pumped through parallel closed circuits and passed through a pre-cooler means that lowers the temperature of the dilute feed solution near to freezing. Accordingly, the dilute feed solution is in optimum condition for processing in the freezer section of said absorber-freezer means.

A fourth utilitarian processing system advantageously combined with the hybrid power system disclosed herein is the Combined Cycle Gas Turbine Dual Chiller and Ice Thermal Storage System shown in FIG. 6 of the drawings. It is significant that this power system is adapted to be used with any one or all of the aforementioned processing systems as disclosed in FIGS. 3, 4 and 5. Accordingly, it will be observed that hot liquid working fluid is available for either or both steam generation or jet processes as shown in FIGS. 4 and 5, and also that super-heated steam is available for the chiller process as shown in FIG. 3. Each of these processes cooperate with the hybrid power system with remaining power used for co-generation of electrical power.

SUMMARY OF THE INVENTION

The hybrid power system disclosed herein is fueled with gas and features a primary gas turbine which is reliable, compact and cost effective, and the producer of shaft power and of a large volume high temperature exhaust. This hybrid system also features a secondary steam turbine which is reliable, compact and cost effective, and the producer of shaft power. The two turbines operate at constant speed (preferably) with torque balanced to the load, dependent upon the equipment or system being operated thereby. In the FIG. 1 embodiment, the gas turbine and steam turbine are independent, their utility being selective. In the FIG. 2 embodiment, the gas turbine and steam turbine are cooperatively combined by coupled and geared engagement to a common power output shaft, and in accordance with this invention said power output shaft drives a co-generator that responds to remaining system energy to generate electrical power. It is an object of this invention to provide a plurality of power sources within this hybrid power system, one of which provides shaft power for driving compressors and the like, or a co-generator; another is a high temperature liquid heat transfer source, and still another is high pressure steam for processing and for turbine operation producing shaft power and for electrical co-generation. These various power sources are made available from this hybrid power system to be implemented individually or simultaneously, and characterized by remaining energy converted into electrical power by co-generation.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a schematic diagram of the hybrid power system of the present invention that features the cooperation of a Brayton cycle turbine and a Rankine cycle turbine, usefully employed to drive a chiller and with co-generation;

FIG. 2 is a schematic view of the cooperative geared drive of the two turbines and their clutch engagement;

PREFERRED EMBODIMENT

Figure 3:
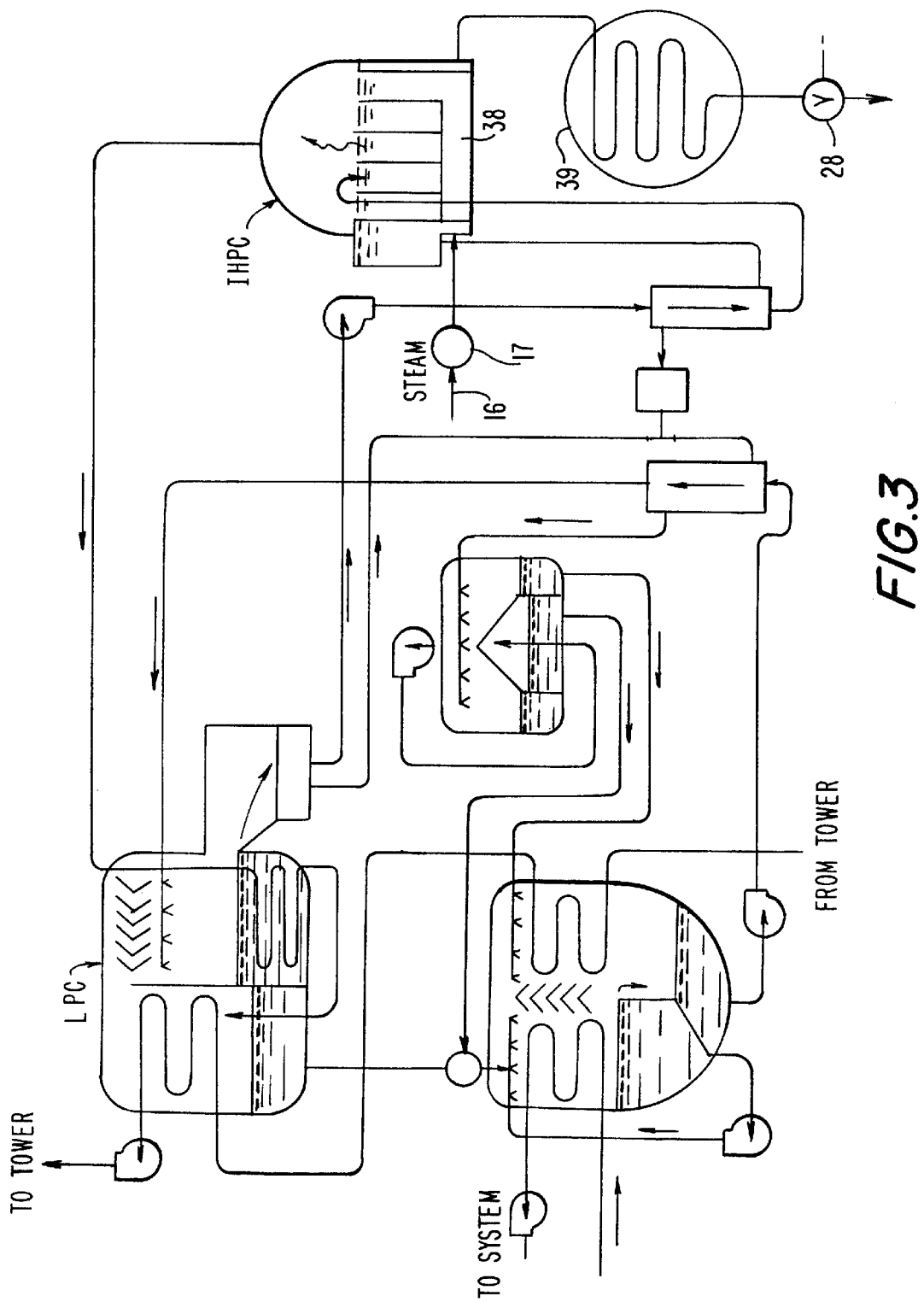
FIG. 3 is a schematic diagram of a REFRIGERANT ENHANCER-ABSORBENT CONCENTRATOR AND TURBO-CHARGED ABSORPTION CHILLER with connections as they are coupled to the system of FIG. 1.

Referring now to the drawings, this hybrid power system is shown in FIG. 1 to have separately operable turbines GT and ST. Turbine GT operates on the Brayton cycle and turbine ST operates on the Rankine cycle. A feature of this invention is that the heat energy of the high temperature exhaust gas turbine GT is recovered and employed to operate the steam turbine ST. The FIG. 1 embodiment illustrates a fluid compression chiller C1 operated by the turbine GT, and a co-generator CG operated by the turbine ST. The energy input into this hybrid system is fuel or gas supplied to the turbine GT at 10. A small amount of waste heat is exhausted from the turbine GT by a flue at 11 emanating from a heat recovery heater HRH that transfers turbine exhaust heat into a closed circuit high temperature heat transfer medium, a liquid state medium such as DOWTHERM, a product of Dow Chemical. The turbine's exhaust is in the 1500° F. range, and the temperature of the heat transfer medium is brought into the 1000° F. range (approximately). Accordingly, there is heat energy residual from which heat is transferred into incoming cold water by means of a heat exchanger HE, to be used as make-up water via a valve 12 or in-house water for example at 180° F. The heat transfer medium is circulated by a pump 13.

With this invention there is a hot water generator HWG for producing high temperature water for example 540° F. and 12000 p.s.i., and a steam generator STG for producing super heated steam for example 750° F. and 650 p.s.i. The closed circuit heat transfer medium flow is in series through the steam generator STG and then through the hot water generator HWG, and return through the heat recovery heater HRH.

Figure 4:
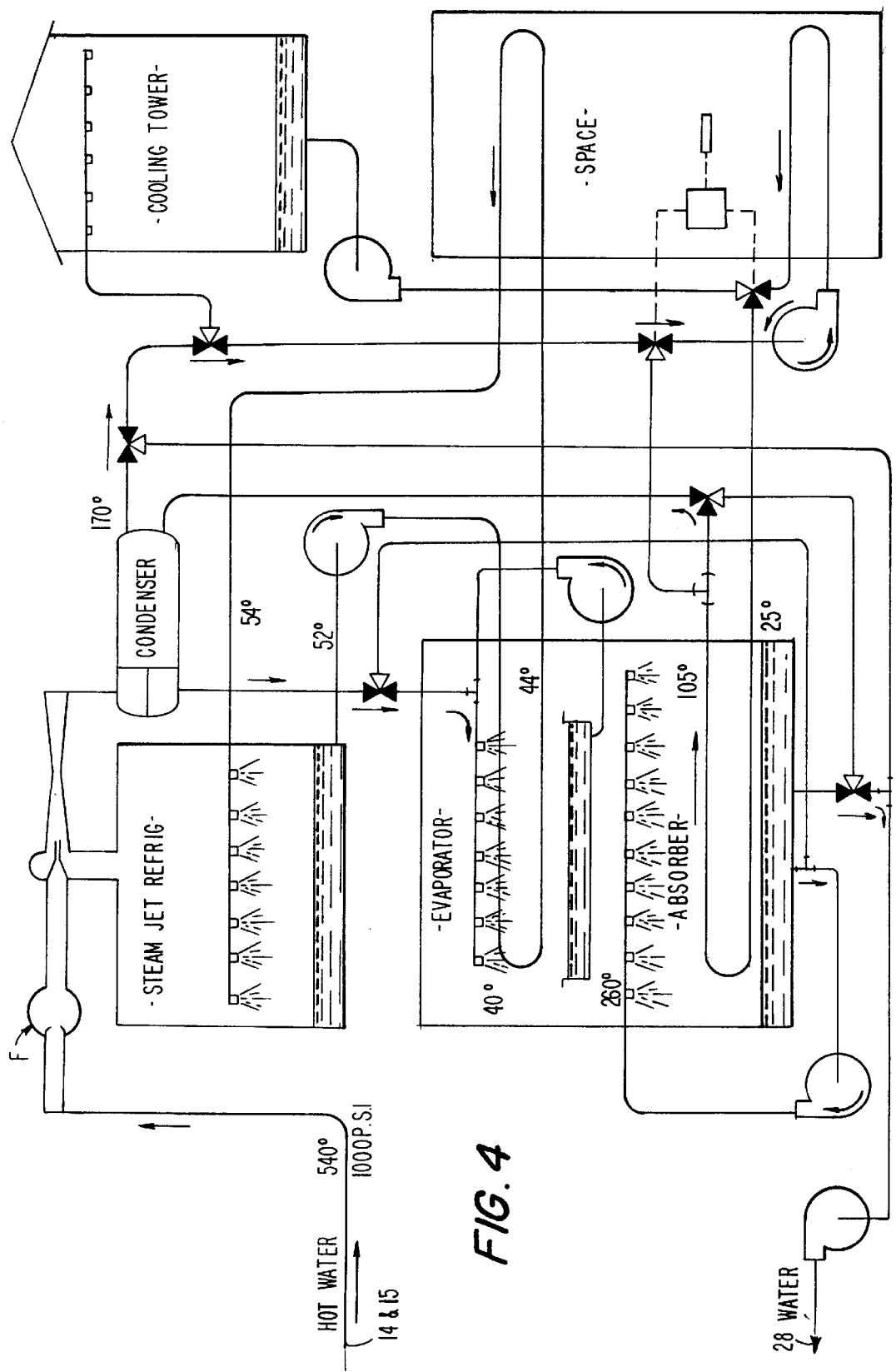
FIG. 4 is a schematic diagram of an ABSORPTION CHILLER-HEAT PUMP SYSTEM with connections as they are coupled to the system of FIG. 1.
Figure 5:
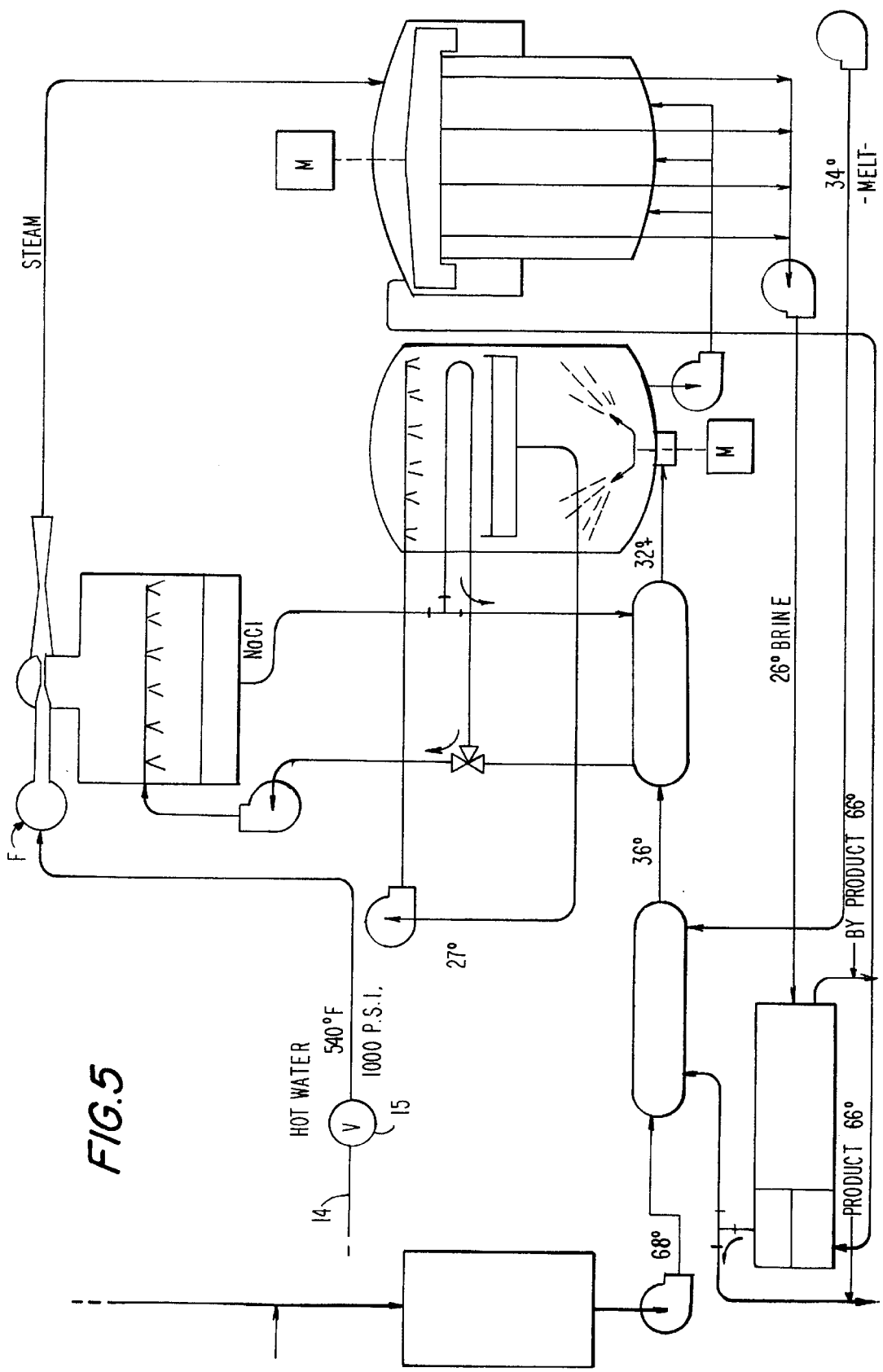
FIG. 5 is a schematic diagram of a FREEZE CONCENTRATION PROCESS with connections as they are coupled to the system of FIG. 1.

In accordance with this invention, there is a super hot water supply (SHWS) line 14 with a service valve 15 for connection into either one of the process systems as they are disclosed in FIGS. 4 and 5. And, there is a super heated steam line 16 with a service valve 17 for connection into the process system as disclosed in FIG. 3. It will be observed that the closed circuit 18 of the heat transfer medium through pump 13 is confined to circulation from the heat recovery heater HRH through the two generators STG and HWG.

The gas turbine GT power shaft is coupled to a base load chiller C1 or the like, by a coupling 20, there being a chilled water supply line (CWSL) for example, at 42° F., and a chilled water return (CHWR) line 22 for example at 52° F.

The chiller C1 is connected to a cooling tower CT by a chilled water supply line CWS and by a chilled water return line CWR, and then to tower water circulated by a pump 19. The cooling tower CT is shared by the steam condenser SC from the turbine ST next described.

The steam turbine ST power shaft is coupled to the co-generator CG or the like by a coupling 23, the steam discharge of said turbine is into a steam condenser SC supplied with cooling tower water through a coil 24. The condensed water is held in a receiver 25 and is returned to the hot water generator HWG by means of a pump 26.

The steam turbine ST is operated by super heated steam for example at 750° F. and 650 p.s.i. generated by the steam generator STG that received super heated heat transfer media from the heat recovery heater HRH, thereby flashing the hot water received thereby from the hot water generator HWG. Super heated steam is delivered directly to the steam turbine ST, and to the service valve 17.

Referring now to FIG. 2 of the drawings, there is a dual gear means 30 for receiving the differential shaft velocities of the two turbines, for converting each to a common velocity at an output shaft 31. The gas turbine GT is coupled to an input shaft 32 by means of a clutch 20, and the generator CG is brought up to operating speed as circumstances require. However, the steam turbine ST is subservient to operation of the gas turbine GT, as it is reliant upon exhaust heat and its transfer into the system. In accordance with this invention therefore, the steam turbine ST is coupled to its output/input shaft 33 by means of an overriding clutch 34, for example a Sprague-type clutch. Therefore, when the steam turbine ST comes up to speed, it then applies torque through the gear means 30 to assist in driving the co-generator CG, or other means, as may be required.

The involvement of dehumidifiers for air conditioning requires the application of heat to desiccant fluids, and to this end there is a diverting valve 35 (FIG. 1) for the hot water discharge of the steam condenser SC coil 24 and through a heat exchanger HX coil 36. Desiccant fluid is circulated by a pump 37 and delivered to a dehumidifier (not shown) via a line DHWS, and returned via a line DHWR. The discharge of heat exchanger HX is to the tower for further cooling.

Referring now to FIG. 3 of the drawings, an absorption chiller system is shown for connection into the hybrid power system hereinabove described. The chiller system shown is the subject of co-pending application Ser. No. 08/427,852 entitled REFRIGERANT ENHANCER-ABSORBENT CONCENTRATOR AND TURBO-CHARGED ABSORPTION CHILLER. As shown herein the direct fired high pressure concentrator of the co-pending application is replaced by an indirect heated high pressure concentrator (IHPC) supplied with super heated steam from line 16 through the power system service valve 17 hereinabove described. The high pressure concentrator IHPC has a heat transfer section 38 supplied with steam through valve 17, to absorb heat therefrom, and to discharge through a condenser 39 that returns water to the valve 28 opening into the return water of the power system and held in the receiver 25 (see FIG. 1).

The absorption chiller of FIG. 3 is a double effect system wherein there are two stages of refrigerant reconcentration of the absorbent solution, a first stage high temperature high pressure concentrator HPC and a second stage low pressure low temperature concentrator LPC. The chilling cycle is driven indirectly by the steam application from the service valve 17 of the hybrid power system and generates refrigerant water vapor at a relatively higher temperature and pressure, and the heat of condensation is used to drive the second stage LPC operating at a lower temperature and pressure. Accordingly, the refrigerant mass is boiled out of solution in each of the two stages, thereby substantially increasing the net generation of refrigerant and cooling capability per unit of heat input. The tower is indicated but not shown, nor is the system water distribution shown, both of which are state of the art.

The first stage concentrator IHPC is essentially a boiler operating on the super heated steam. And, the second stage concentrator LPC is comprised of a heat transfer coil through which the refrigerant vapor is passed, and a refrigerant condenser which condenses the refrigerant mass.

Referring now to FIG. 4 of the drawings, an absorption chiller-heat pump system is shown for connection into the hybrid power system hereinabove described. The chiller-heat pump system shown is the subject of U.S. Pat. No. 4,290,273 entitled PELTIER EFFECT-ABSORPTION CHILLER-HEAT PUMP SYSTEM. The Peltier effect embodiment does not prove itself to be cost effective in providing the necessary hot water for steam-jet refrigeration, and is replaced herein by the direct application of super-heated water from line 14 through the power system service valve 15. As shown, the super heated water at 540° F. and 1000 p.s.i. is supplied directly to the flash means F of the steam-jet. The high pressure water is passed through said flash chamber for conversion to steam and to reduce its temperature and pressure values to those required for the steam-jet refrigeration that follows. The high temperature strong absorbent is passed through a heat exchanger so as to recover heat into the weak absorbent feed to the generator. The steam-jet refrigeration unit discharges high temperature steam passed through the condenser means to change its condition to liquid and to transfer heat into a space heating circuit when desired. When in the cooling mode, the condenser heat discharge is passed through the cooling tower. The chilled water is passed through the evaporator section of the chiller-heater means for a further reduction in temperature and thence through a space cooling circuit when required. The evaporator-absorber means has a recirculation circuit for the evaporator section thereof and a recirculation circuit for the absorber section thereto, and it has a chilled water circuit to and from the evaporator section and a heated water circuit to and from the absorber section. Weak absorbent feed to the generator means is from the absorber section or from the condenser means.

Referring now to FIG. 5 of the drawings, a freeze concentration system and its process for connection into the hybrid power system hereinabove described. The freeze concentration process shown is the subject of U.S. Pat. No. 4,328,677 entitled PELTIER FREEZE CONCENTRATION PROCESS. As stated above, the Peltier effect is not proved to be cost effective for the type of purpose involved herein, and is replaced by the direct application of super-heated water from line 14 through the power system service valve 15. As shown, the super heated water at 540° F. and 1000 p.s.i. is supplied directly to the flash means F of the steam-jet. The high temperature high pressure water is passed through a flash chamber of means F for conversion to steam and so as to reduce its temperature and pressure values to those required for the steam-jet refrigeration that follows. High temperature strong absorbent is passed through a heat exchanger so as to recover heat. The steam-jet refrigeration means discharges high temperature steam that is passed through the melt section of the melter-washer means and through a condenser means to change its condition to liquid for discharge with product discharge. Chilled heat transfer fluid (NaCl) from the steam-jet refrigeration means is passed through a closed circuit to the pre-cooler means for lowering the temperature of dilute feed solution closely to that of freezing. Concentrate absorbent fluid from the generator means and heat exchanger is passed through the absorber section of the absorber-freezer means and recirculates in a closed circuit through said heat exchanger for heat recovery and return to said generator means. The absorber tube bundle in the absorber section of the absorber-freezer means is in parallel with the aforesaid closed circuit through the pre-cooler means. The system is operational without a cooling tower, as shown. The absorber-freezer means is thereby made to produce an ice slurry of the dilute feed solution and the melter-washer is made to separate product and by-product. In the case of desalination, the product is potable water and the by-product is brine. In the case of Distillers Dried Grains and Solubles (DDGS) production the melt is drawn off and the concentrate is subsequently dehydrated for compaction into nutrient material.

Figure 6:
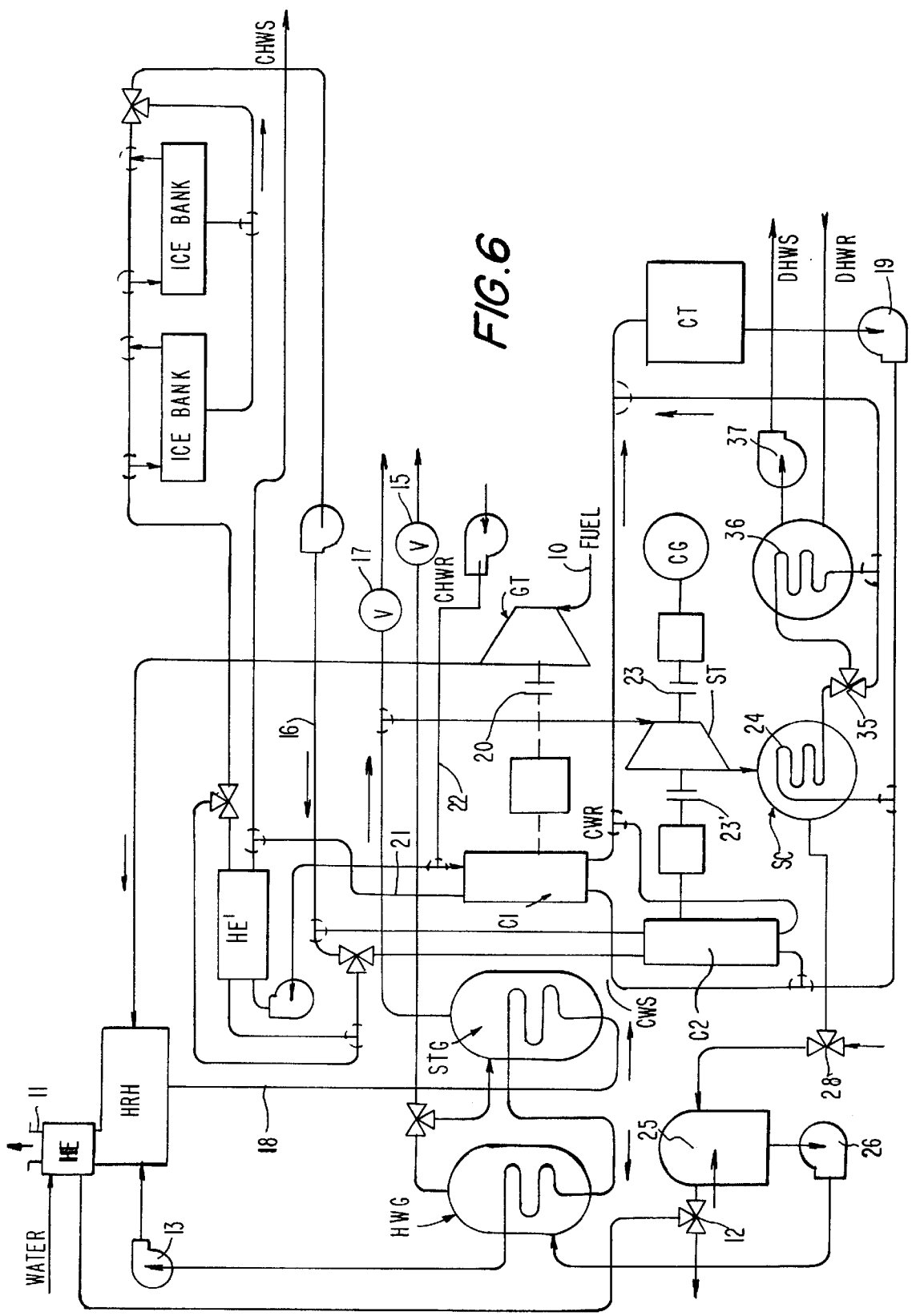
FIG. 6 is a schematic diagram of a COMBINED BRAYTON AND RANKINE CYCLE TURBINE POWERED DUAL CHILLER AND ICE THERMAL STORAGE SYSTEM with connections as they are coupled to the system of FIG. 1.

Referring now to FIG. 6 of the drawings, the hybrid power system is shown combined with ice thermal storage. A feature of this combination is the dual chiller means C1 and C2, one chiller operated by each of the two turbines GT and ST. Chiller C1 is a base chiller, and chiller C2 is an ice bank chiller, each directly driven by a turbine GT or ST and a clutch drive, 20 or 23. The steam turbine ST is coupled by a clutch 23 to a co-generator (CG). A glycol-water refrigerant heat transfer solution or the like is processed by the chiller C2 and is controlled by a valve means and pumped through a heat exchanger HE', to circulate through the ice banks in order to generate the chilled water supply (CHWS), and/or to charge or discharge the ice banks, as shown.

The hybrid system of FIG. 6 is the same as that shown and described in FIG. 1, but with the added feature of chiller C2 and the inclusion of ice bank storage. Accordingly, the chiller C1 is driven by the gas turbine GT through clutch 20, while the co-generator CG is driven by the steam turbine ST through clutch 23, all as hereinabove described. As shown, the ice chiller C2 is also driven by the steam turbine ST through a clutch 23'. Gear means is indicated for each drive application, as in FIG. 2 for example.

Most efficient use of fuel and energy recovery is attained. For example, 1) during summer On-Peak hours hot ambient combustion air entering the gas turbine GT is precooled by stored ice bank cooling generated during Off-Peak hours, thereby providing additional shaft power to drive the base ice chiller C1. The Brayton cycle gas turbine GT drives the base chiller C1 with the exhaust heat energy recovered and applied to the Rankine cycle steam turbine ST. Efficiency of the gas turbine GT can be optimized by employing ice bank storage to cool intake combustion air for increasing the shaft output power. The operation of the steam turbine ST can be operation of the steam turbine ST can be selectively employed through the clutches 23 and 23' to disconnect or operate the ice bank chiller C2 or co-generator CG, or both, as circumstances require. For example; 2) during Off-Peak hour conditions, the gas turbine GT is shut down and eliminates the energy source for the steam turbine ST, in which case the co-generator is energized from a source of external power to motorize the chiller C2 through said clutches 23 and 23', all as circumstances require to charge the ice banks by means of associated pumps and valving as shown in FIG. 6.

Having described only the preferred forms and applications of my invention, I do not wish to be limited or restricted to the specific details herein set forth, but wish to reserve to myself any modifications or variations that may appear to those skilled in the art as set forth within the limits of the following claims.

What is claimed is:

1. A system for ice bank storage and for providing multiple power sources and including;
   a primary fueled Brayton cycle turbine producing shaft power driving a base compressor for refrigeration and producing high heat energy exhaust gases;
   a heat recovery device for transferring high heat energy from said exhaust gases into a first fluid heat transfer medium flowing therethrough;
   a hot water generator for producing high temperature water in a closed circuit through said heat recovery device for the transfer of heat energy from said first fluid heat transfer medium to produce high temperature water;
   a steam generator for producing steam from said high temperature water supplied thereto and in said closed circuit with said hot water generator and heat recovery device for the transfer of heat energy from said first fluid heat transfer medium to produce said steam;
   a secondary Rankine cycle turbine operated by said steam from the steam generator and producing shaft power driving an ice chiller for circulation of a second heat transfer medium; and
   an ice bank structure in a closed circuit with said circulation of said second heat transfer medium from said ice chiller for ice storage.

2. The system as set forth in claim 1, wherein the Rankine cycle turbine is coupled to said ice chiller with an overriding clutch.

3. The system as set forth in claim 1, wherein the Rankine cycle turbine is coupled by a clutch to an electrical generator.

4. The system as set forth in claim 1, wherein the water produced by said hot water generator operates an absorption chiller.

5. The system as set forth in claim 1, wherein the water produced by said hot water generator operates an absorption chiller and heat pump.

6. The system as set forth in claim 1, wherein the water produced by said hot water generator operates a freeze concentration process.

7. The system as set forth in claim 1, wherein the water produced by said hot water generator operates a jet refrigeration system.

8. A system for ice bank storage and for providing multiple power sources and including;
   a primary fueled Brayton cycle turbine producing shaft power driving a base compressor for refrigeration and producing high heat energy exhaust gases;
   a heat recovery device for transferring high heat energy from said exhaust gases into a first fluid heat transfer medium flowing therethrough;
   a hot water generator for producing high temperature water in a closed circuit through said heat recovery device for the transfer of heat energy from said first fluid heat transfer medium to produce high temperature water;
   a steam generator for producing steam from said high temperature water supplied thereto and in said closed circuit with said hot water generator and heat recovery device for the transfer of heat energy from said first fluid heat transfer medium to produce said steam;
   a secondary Rankine cycle turbine operated by said steam from the steam generator and producing shaft power driving an ice chiller for circulation of a second heat transfer medium, an ice bank structure in a closed circuit with said circulation of said second heat transfer medium from said ice chiller for ice storage, wherein the circulation of said second heat transfer medium is controlled by valve means for selective flow through said ice bank structure and through a heat exchanger for transfer of heat from a chilled water supply line.

* * * * *